United States Patent
Kang

(10) Patent No.: US 12,456,076 B2
(45) Date of Patent: Oct. 28, 2025

(54) ACTIVATION BASED DYNAMIC NETWORK PRUNING

(71) Applicant: REBELLIONS INC., Seongnam-si (KR)

(72) Inventor: Minhoo Kang, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 35 days.

(21) Appl. No.: 18/537,689

(22) Filed: Dec. 12, 2023

(65) Prior Publication Data

US 2024/0394594 A1 Nov. 28, 2024

(30) Foreign Application Priority Data

May 26, 2023 (KR) .................. 10-2023-0068299

(51) Int. Cl.
*G06N 20/00* (2019.01)

(52) U.S. Cl.
CPC .................. *G06N 20/00* (2019.01)

(58) Field of Classification Search
CPC .................. G06N 20/00
See application file for complete search history.

(56) References Cited

U.S. PATENT DOCUMENTS

| | | | | |
|---|---|---|---|---|
| 2018/0232640 A1* | 8/2018 | Ji | ............ | G06N 3/045 |
| 2019/0057308 A1* | 2/2019 | Cho | ............ | G06N 3/065 |
| 2019/0065195 A1* | 2/2019 | Pool | ............ | G06F 9/3016 |
| 2019/0228344 A1 | 7/2019 | Hong et al. | | |
| 2019/0362235 A1* | 11/2019 | Xu | ............ | G06T 17/00 |
| 2020/0134459 A1* | 4/2020 | Zeng | ............ | G06N 3/045 |
| 2020/0242454 A1 | 7/2020 | Kim et al. | | |
| 2021/0004442 A1* | 1/2021 | Sapugay | ............ | G06F 40/295 |
| 2022/0019897 A1 | 1/2022 | Park et al. | | |
| 2022/0245457 A1* | 8/2022 | Srinivas | ............ | G06F 18/2136 |
| 2022/0327367 A1* | 10/2022 | Judd | ............ | G06N 3/084 |

(Continued)

FOREIGN PATENT DOCUMENTS

| | | |
|---|---|---|
| KR | 10-2019-0088643 A | 7/2019 |
| KR | 10-2020-0094534 A | 8/2020 |
| KR | 10-2021-0125911 A | 10/2021 |

(Continued)

OTHER PUBLICATIONS

Sim et al., "SparTANN: Sparse training accelerator for neural networks with threshold-based sparsification", 2020, Proceedings of the ACM/IEEE International Symposium on Low Power Electronics and Design, vol. 2020, pp. 211-216 (Year: 2020).*

(Continued)

*Primary Examiner* — Leonard A Sieger
(74) *Attorney, Agent, or Firm* — BROADVIEW IP LAW, PC

(57) ABSTRACT

A method for controlling operations of a machine learning model is performed by one or more processors and includes determining a threshold for skipping an operation, acquiring an activation value associated with at least one layer included in the machine learning model, determining whether the activation value is less than the threshold, and if the activation value is less than the threshold, controlling the operations of the machine learning model such that an operation associated with the activation value is skipped in the machine learning model.

11 Claims, 11 Drawing Sheets

(56) References Cited

U.S. PATENT DOCUMENTS

| | | | | |
|---|---|---|---|---|
| 2023/0153623 | A1* | 5/2023 | Bond | G06N 3/084 706/25 |
| 2024/0176981 | A1* | 5/2024 | Khodamoradi | G06N 3/082 |

FOREIGN PATENT DOCUMENTS

| KR | 10-2022-0010383 A | 1/2022 |
|---|---|---|
| KR | 10-2022-0082220 A | 6/2022 |
| KR | 10-2022-0133566 A | 10/2022 |

OTHER PUBLICATIONS

Vestias et al., "Fast Convolutional Neural Networks in Low Density FPGAs Using Zero-Skipping and Weight Pruning", 2019, Electronics, vol. 8, pp. 1-24 (Year: 2019).*

Whatmough et al., "DNN Engine: A 28-nm Timing-Error Tolerant Sparse Deep Neural Network Processor for IoT Applications", 2018, IEEE Journal of Solid-State Circuits, vol. 53 No. 9, pp. 2722-2731 (Year: 2018).*

Bakhtiary et al., "Winner takes all hashing for speeding up the training of neural networks in large class problems", 2017, Pattern Recognition Letters, vol. 93, pp. 38-47 (Year: 2017).*

Wu et al., "Guessing Outputs of Dynamically Pruned CNNs Using Memory Access Patterns", 2021, IEEE Computer Architecture Letters, vol. 20 No. 2, pp. 98-101 (Year: 2021).*

Kurtz et al., "Inducing and exploiting activation sparsity for fast inference on deep neural networks", 2020, International Conference on Machine Learning, vol. 2020, pp. 5533-5543 (Year: 2020).*

Raihan et al., "Sparse weight activation training", 2020, Advances in Neural Information Processing Systems, vol. 33 (2020), pp. 15625-15638 (Year: 2020).*

Machupalli et al., "Review of ASIC accelerators for deep neural network", 2022, Microprocessors and Microsystems, vol. 89, pp. 1-19 (Year: 2022).*

Im et al., "DT-CNN: An Energy-Efficient Dilated and Transposed Convolutional Neural Network Processor for Region of Interest Based Image Segmentation", 2020, IEEE Transactions on Circuits and Systems I: Regular Papers, vol. 67 No. 10, pp. 3471-3483 (Year: 2020).*

Huan et al., "A Low-Power Accelerator for Deep Neural Networks with Enlarged Near-Zero Sparsity", 2017, arXiv, v1, pp. 1-5 (Year: 2017).*

Lee et al., "An accurate and fair evaluation methodology for SNN-based inferencing with full-stack hardware design space explorations", 2021, Neurocomputing, vol. 455, pp. 125-138 (Year: 2021).*

Zhang et al., "Adaptive Filter Pruning via Sensitivity Feedback", Mar. 8, 2023, IEEE Transactions on Neural Networks and Learning Systems, vol. 35 No. 8, pp. 10996-11008 (Year: 2023).*

Haberer et al., "Activation Sparsity and Dynamic Pruning for Split Computing in Edge AI", 2022, DistributedML '22: Proceedings of the 3rd International Workshop on Distributed Machine Learning, vol. 3 (2022), pp. 30-36 (Year: 2022).*

* cited by examiner

ACTIVATION BASED DYNAMIC NETWORK PRUNING

CROSS-REFERENCE TO RELATED APPLICATION

This application claims priority under 35 U.S.C § 119 to Korean Patent Application No. 10-2023-0068299, filed in the Korean Intellectual Property Office on May 26, 2023, the entire contents of which are hereby incorporated by reference.

BACKGROUND

Technical Field

The present disclosure relates to a method for controlling an operation for machine learning, and specifically, to a method and system for controlling an operation of a machine learning model such that an operation associated with an activation value that will not affect the operation result is skipped.

Description of Related Art

A machine learning model for implementing artificial intelligence may include an artificial neural network. The artificial neural network may include a plurality of layers, and each of the plurality of layers may include at least one node. In addition, the node may be related to weights, and the weights may converge to a constant value as the artificial neural network is repeatedly trained.

However, as the artificial neural network is more complex or the number of input data increases, the hardware resources required to output the final result may increase, and along with this, delay time may also increase. Accordingly, there is a demand for a machine learning model that can reduce computing resources used in artificial neural networks and quickly output operation results.

SUMMARY

In order to address one or more problems (e.g., the problems described above and/or other problems not explicitly described herein), the present disclosure provides a method, a computer program stored in a computer-readable recording medium, a computer-readable recording medium, and a device (system) for controlling an operation of a machine learning model.

The present disclosure may be implemented in a variety of ways, including methods, devices (systems) and/or computer programs stored in computer readable storage media.

A method for controlling operations of a machine learning model may be performed by one or more processors and may include determining a threshold for skipping an operation, acquiring an activation value associated with at least one layer included in the machine learning model, determining whether the activation value is less than the threshold, and if the activation value is less than the threshold, control operations of the machine learning model such that an operation associated with the activation value is skipped in the machine learning model.

In addition, the determining the threshold may include determining the threshold based on a distribution of a plurality of activation values associated with the at least one layer.

In addition, the determining the threshold may include acquiring a target activation value for comparison from a plurality of activation values associated with the at least one layer, and if the acquired target activation value is less than the threshold, updating the threshold such that the threshold is decreased by a predetermined amount.

In addition, the determining the threshold may include measuring a time during which the threshold does not change, and if the measured time reaches a predetermined threshold time, updating the threshold such that the threshold is increased by a predetermined amount.

In addition, the acquiring the activation value may include acquiring the activation value output from a first layer included in the machine learning model, and the controlling operation of the machine learning model may include, if the activation value is less than the threshold, determining the activation value to be zero and storing the activation value to be zero in a memory.

In addition, the controlling the operation of the machine learning model may include, if operations associated with a second layer into which an output value from the first layer is input are performed, controlling the operations of the machine learning model such that an operation associated with the activation value determined to be zero is skipped.

In addition, the acquiring the activation value may include acquiring the activation value from the memory, and the activation value may include an output value from the first layer included in the machine learning model. In addition, the controlling the operation of the machine learning model may include, if operations associated with a second layer into which an output value from the first layer is input are performed, and the output value from the first layer is less than the threshold, controlling the operations of the machine learning model such that an operation associated with the output value from the first layer is skipped in the second layer.

A method for controlling operations of a machine learning model may be performed by one or more processors and may include acquiring an activation value associated with at least one layer included in the machine learning model, in which the activation value may be expressed as a floating point number in a predetermined format, acquiring an exponent from the activation value expressed as the floating point number, determining whether the acquired exponent is less than a threshold, and if the acquired exponent is less than the threshold, controlling the operations of the machine learning model such that an operation associated with the activation value is skipped in the machine learning model.

In addition, the threshold may be a value obtained by multiplying 2 by a predetermined number of times.

In addition, each of the activation value and the threshold may be a binary number.

In addition, the method for controlling the operations may further include, before acquiring the activation value, determining the threshold based on a distribution of a plurality of activation values associated with the at least one layer.

In addition, the determining the threshold may include determining a target activation value for comparison from a plurality of activation values associated with the at least one layer, acquiring a target exponent from the determined target activation value, and if the acquired target exponent is less than the threshold, updating the threshold such that the threshold is decreased by a predetermined amount.

In addition, the updating the threshold may include decreasing the threshold by dividing the threshold by 2.

In addition, the determining the threshold may include measuring a time during which the threshold does not change, and if the measured time reaches a predetermined threshold time, updating the threshold such that the threshold is increased by a predetermined amount.

In addition, the updating the threshold may include updating the threshold by multiplying the threshold by 2.

In addition, the acquiring the activation value may include acquiring the activation value output from a first layer included in the machine learning model, and the controlling operation of the machine learning model may include, if the acquired exponent is less than the threshold, determining the activation value to be zero and storing the activation value to be zero in a memory.

In addition, the controlling the operation of the machine learning model may include, if operations associated with a second layer into which an output value from the first layer is input are performed, controlling the operations of the machine learning model such that an operation associated with the activation value determined to be zero is skipped.

In addition, the acquiring the activation value may include acquiring the activation value from the memory, the activation value may include an output value from a first layer included in the machine learning model, and the controlling operation of the machine learning model may include, if operations associated with a second layer into which the output value from the first layer is input are performed, and an exponent of the output value from the first layer is less than the threshold, controlling the operations of the machine learning model such that an operation associated with the activation value is skipped.

There may be provided a computer-readable non-transitory recording medium recording instructions for causing performance of the method described above on a computer.

A processing system may include a memory storing one or more instructions, and a processor configured to execute one or more instructions in the memory to determine a threshold for skipping an operation, acquire an activation value associated with at least one layer included in the machine learning model, determine whether the activation value is less than the threshold, and if the activation value is less than the threshold, control operations of the machine learning model such that the operation associated with the activation value is skipped in the machine learning model.

According to some examples of the present disclosure, the operations of the machine learning model may be controlled such that an activation value that will not affect the operation result is determined, and the operation associated with the determined activation value is skipped in the machine learning model. Accordingly, computing resources inputted to operate the machine learning model can be reduced, and the time until operation results are output from the machine learning model can be shortened.

According to some examples of the present disclosure, a threshold for skipping the operation can be dynamically determined based on the activation values distributed in at least one layer of a machine learning model. Accordingly, the threshold can be adaptively determined based on the operating environment of the machine learning model, and the range of the activation values for skipping can be flexibly determined.

According to some examples of the present disclosure, the activation value is expressed as a hardware-friendly floating point number, and the exponent included in the activation value is compared with the threshold, so that the activation value for skipping can be determined more quickly.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
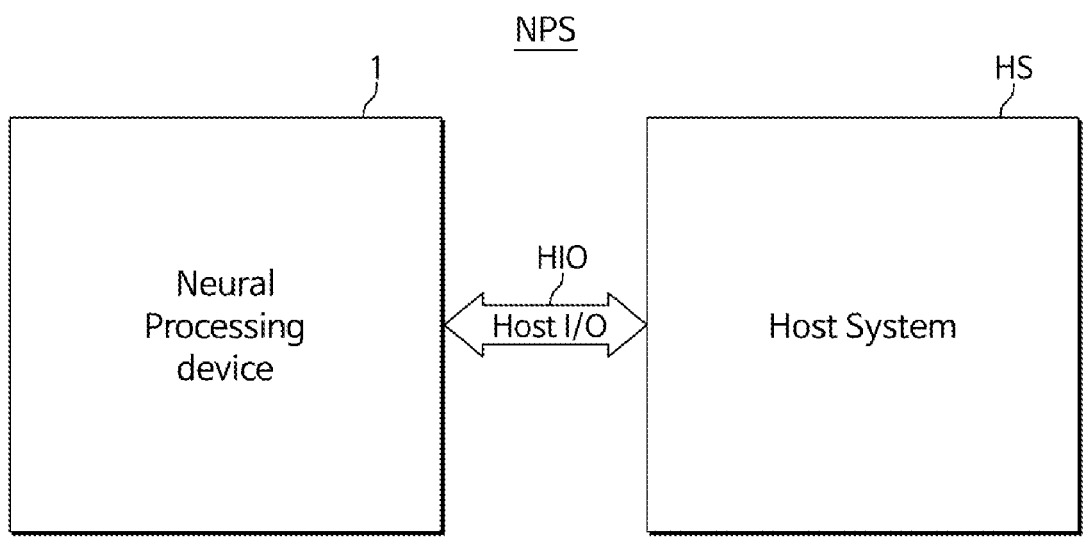
FIG. 1 is a block diagram provided to explain a neural processing system.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

A "module" or "unit" may be implemented as a processor and a memory, or may be implemented as a circuit (circuitry). Terms such as "circuit" or "circuitry" may refer to a circuit on hardware, but may also refer to a circuit on software. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or marking data storage, registers, and so on. The memory is said to be in electronic communication with a processor if the processor can read information from and/or write information to the memory. The memory integrated with the processor is in electronic communication with the processor.

In the present disclosure, "each of a plurality of A" may refer to each of all components included in the plurality of A, or may refer to each of some of the components included in a plurality of A.

In addition, terms such as first, second, A, B, (a), (b), etc. used in the following examples are only used to distinguish certain components from other components, and the nature, sequence, order, etc. of the components are not limited by the terms.

In addition, in the following examples, if a certain component is stated as being "connected," "combined" or "coupled" to another component, it is to be understood that there may be yet another intervening component "connected," "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

In addition, in the following examples, "determining whether a value is less than", "if a value is less than", or the like are disclosed, but "determining whether a value is equal to or less than" or "if a value is equal to or less than" may also be applied to the corresponding examples.

Before describing various examples of the present disclosure, terms used herein will be explained.

In the present disclosure, "machine learning model" may include any model that is used for inferring an answer to a given input. The machine learning model may include an artificial neural network model including an input layer, a plurality of hidden layers, and an output layer. Each layer may include a plurality of nodes. In addition, in the present disclosure, the machine learning model may refer to an artificial neural network model, and the artificial neural network model may refer to the machine learning model.

An "activation value" may be an operation result associated with at least one layer of a machine learning model and/or an input value for an operation. At least one layer may be associated with an activation function. For example, the activation value may be an operation result associated with at least one node included in the layer. The activation may be associated with "input activation" and/or "output activation". The input activation may be related to data being input into at least one layer of the machine learning model, and an output activation may be related to data being output from at least one layer of the machine learning model. One activation may be an output activation for the first layer and an input activation for the second layer.

In the present disclosure, "instructions" may refer to a series of computer readable instructions grouped based on functions, and to a component of a computer program being executed by a processor.

FIG. 1 is a block diagram provided to explain a neural processing system (NPS). Referring to FIG. 1, a neural processing system (NPS) according to some examples of the present disclosure may include a neural processing device 1, a host system (HS), and a host interface (HIO).

The neural processing device 1 may be provided to perform operations using an artificial neural network. For example, the neural processing device 1 may be a device specialized for performing deep learning operation tasks. However, aspects are not limited to the above.

The neural processing device 1 may be a processing device other than a neural processing device. For example, the neural processing device 1 may be a graphics processing unit (GPU), a central processing unit (CPU), or other types of processing devices.

The host system HS may be a system that instructs the neural processing device 1 to perform an operation task and retrieves the results of the operation task. Compared to the neural processing device 1, the host system HS may be a system that is not specialized for deep learning operation tasks. However, aspects are not limited to the above.

The host interface HIO may transmit data and control signals between the neural processing device 1 and the host system HS. For example, the host interface HIO may transmit commands and data of the host system HS to the neural processing device 1, and accordingly, the neural processing device 1 may perform operation tasks. When completing the operation task, the neural processing device 1 may transmit the result to the host system HS through an interrupt request. For example, the host interface HIO may be PCI Express (PCIe), but is not limited thereto.

Figure 2:
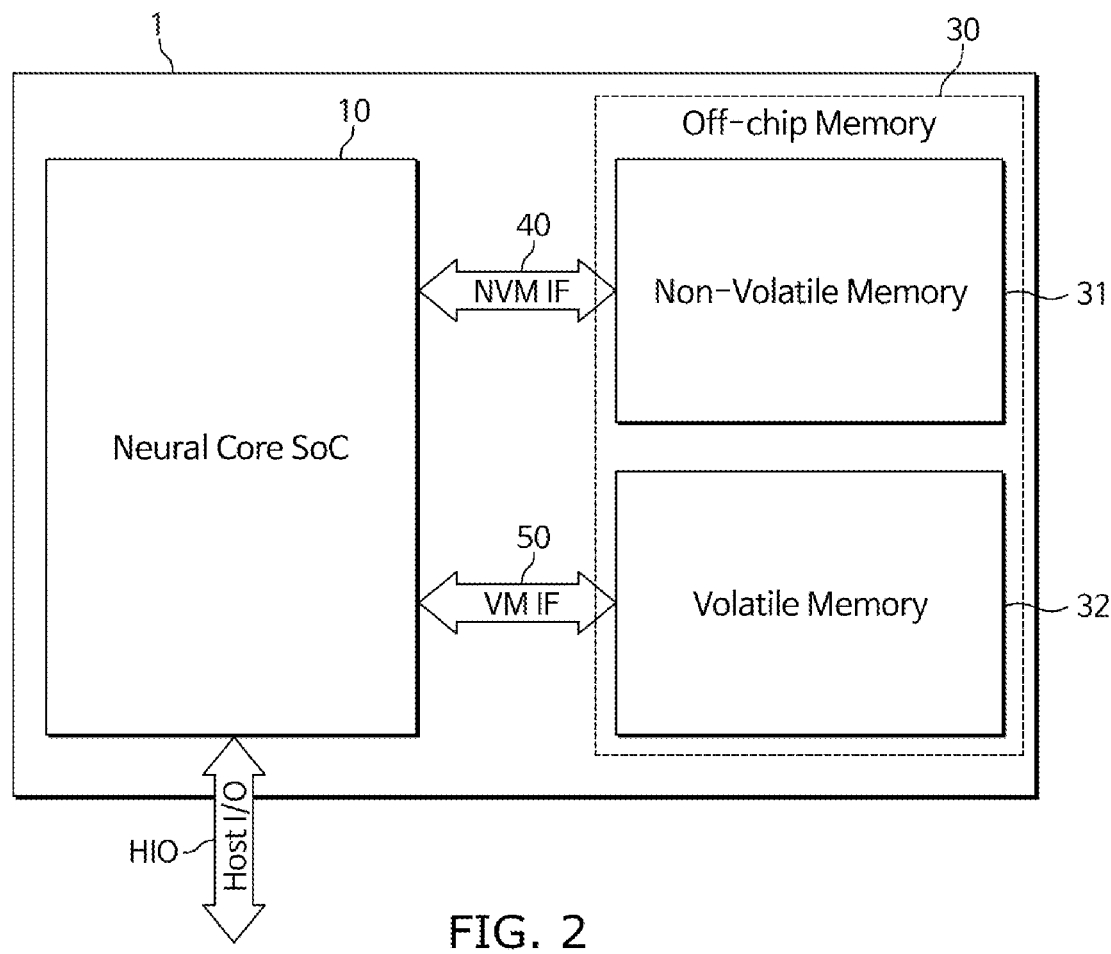
FIG. 2 is a block diagram provided to explain the neural processing device of FIG. 1 in detail.

FIG. 2 is a block diagram provided to explain the neural processing device of FIG. 1 in detail. Referring to FIG. 2, the neural processing device 1 may include a neural core SoC 10, an off-chip memory 30, a non-volatile memory interface 40, and a volatile memory interface 50.

The neural core SoC 10 may be a System on Chip device. The neural core SoC 10 may be an artificial intelligence operation unit and may include an accelerator. The neural core SoC 10 may include at least one of a graphics processing unit (GPU), a field programmable gate array (FPGA), and an application-specific integrated circuit (ASIC), for example. However, aspects are not limited to the above.

The neural core SoC 10 may exchange data with other external operation units through a separate external interface. In addition, the neural core SoC 10 may be connected to a non-volatile memory 31 and a volatile memory 32 through the non-volatile memory interface 40 and the volatile memory interface 50, respectively.

The off-chip memory 30 may be a memory disposed outside a chip of the neural core SoC 10. The off-chip memory 30 may include the non-volatile memory 31 and the volatile memory 32.

The non-volatile memory 31 may be a memory that continuously retains stored information even when there is no power supply. The non-volatile memory 31 may store one or more instructions for controlling operations of a machine learning model, which will be described below. For example, the non-volatile memory 31 may include at least one of a Read-Only Memory (ROM), a Programmable Read-Only Memory (PROM), an Erasable Alterable ROM (EAROM), an Erasable Programmable Read-Only Memory (EPROM), an Electrically Erasable Programmable Read-Only Memory (EEPROM) (e.g., a NAND flash memory, a NOR flash memory), an Ultra-Violet Erasable Programmable Read-Only Memory (UVEPROM), a Ferroelectric Random Access Memory (FeRAM), a Magnetoresistive Random Access Memory (MRAM), a Phase-change Random Access Memory (PRAM), a silicon-oxide-nitride-oxide-silicon (SONOS), a Resistive Random Access Memory (RRAM), a Nanotube Random Access Memory (NRAM), a magnetic computer storage devices(e.g., hard disk, diskette drive, magnetic tape), an optical disk drive, or 3D XPoint memory. However, aspects are not limited to the above.

Unlike the non-volatile memory 31, the volatile memory 32 may be a memory that continuously requires power to maintain stored information. For example, the volatile memory 32 may include at least one of a Dynamic Random Access Memory (DRAM), a Static Random Access Memory (SRAM), a Synchronous Dynamic Random Access Memory (SDRAM), and a Double Data Rate SDRAM (DDR SDRAM). However, aspects are not limited to the above.

For example, the non-volatile memory interface 40 may include at least one of a Parallel Advanced Technology Attachment (PATA), a Small Computer System Interface (SCSI), a Serial Attached SCSI (SAS), a Serial Advanced Technology Attachment (SATA), and a PCI Express (PCIe). However, aspects are not limited to the above.

For example, the volatile memory interface 50 may include at least one of Single Data Rate (SDR), Double Data Rate (DDR), Quad Data Rate (QDR), eXtreme Data Rate (XDR), and Octal Data Rate. However, aspects are not limited to the above.

The neural core SoC 10 may include one or more processors, and the processor may be configured to execute one or more instructions stored in the non-volatile memory 31 or the volatile memory 32 to determine a threshold for skipping an operation, acquire an activation value associated with at least one layer included in the machine learning model, determine whether the activation value is less than the threshold, and if the activation value is less than the threshold, control operations of the machine learning model such that the operation associated with the activation value is skipped in the machine learning model.

Figure 3:
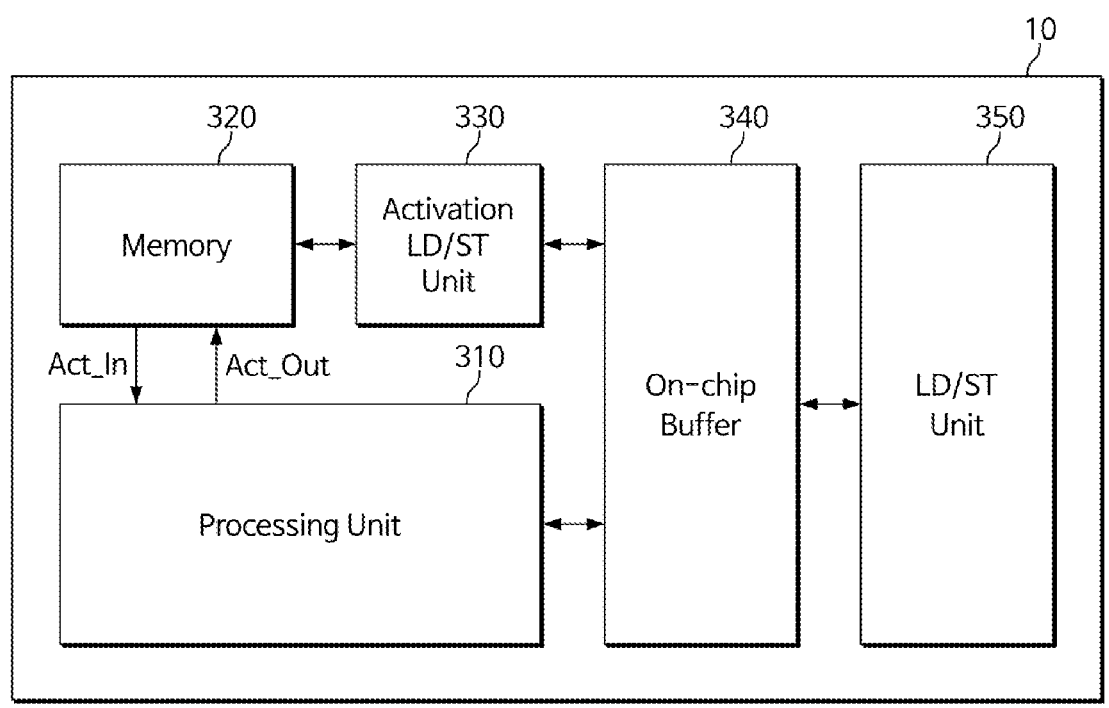
FIG. 3 is a block diagram provided to explain the neural core SoC of FIG. 1 in detail.

FIG. 3 is a block diagram provided to explain the neural core SoC 10 of FIG. 1 in detail. As shown in FIG. 3, the neural core SoC 10 may include a processing unit 310, a memory 320, an activation load/store unit 330, an on-chip buffer 340, and a load/store unit 350.

The processing unit 310 may be a module that performs operations associated with a machine learning model. The processing unit 310 may perform not only one-dimensional operations but also two-dimensional (2D) matrix operations (e.g., convolution operations, etc.). The processing unit 310 may receive an input activation (Act_In) value and generate an output activation (Act_Out) value based on the operation result of the multiplication by the weight.

For the 2D matrix operations, the processing unit 310 may include a processing element (PE) array (not shown). The PE array may include a plurality of processing elements. Each of the plurality of processing elements is allocated resources of the processing unit 310, and may be implemented logically or physically. Each of the plurality of processing elements may be related to at least one layer of the artificial neural network. For example, each of first to fourth processing elements of the plurality of processing elements may be related to each of first to fourth nodes included in the first layer. As another example, each of fifth to eighth processing elements of the plurality of processing elements may be related to each of fifth to eighth nodes included in the second layer. Each of the plurality of processing elements may perform a multiplication operation of the input activation (Act_In) value and the weight (weight).

The processing unit 310 may output an output activation (Act_Out) value based on at least one activation value received from at least one processing element.

The memory 320 may provide an input activation (Act_In) value to the processing unit 310, and receive and store an output activation (Act_Out) value from the processing unit 310. For example, the memory 320 may temporarily store values associated with each of input activation (Act_In) and output activation (Act_Out). According to some examples, the memory 320 may include storage means such as a buffer.

The input activation (Act_In) and the output activation (Act_Out) may be related to the inputs and outputs of the layers of the neural network. If the neural network has a plurality of layers, the output value of the previous layer is the input value of the next layer, so the output activation (Act_Out) value of the previous layer may be used as the input activation (Act_In) value of the next layer.

The activation load/store unit 330 may transmit the input activation (Act_In) value acquired from the on-chip buffer 340 to the memory 320, and may transmit the output activation (Act_Out) value acquired from the memory 320 to the on-chip buffer 340. That is, the activation load/store unit 330 may perform activation load and/or store tasks.

The on-chip buffer 340 may be a storage means located inside the neural core SoC 10, and may allow the neural core SoC 10 to receive all input data required for the task from the outside and temporarily store the data. In addition, the on-chip buffer 340 may temporarily store the output data operated by the neural core SoC 10 to transmit the same to the outside.

The on-chip buffer 340 may transmit an input activation (Act_In) value to the memory 320 and receive an output activation (Act_Out) value from the memory 320 through the activation load/store unit 330. The on-chip buffer 340 may directly transmit and receive data to and from not only the activation load/store unit 330, but also the processing unit 310.

The load/store unit 350 may receive at least one of input data, program, or control signal from the outside through an external interface. The load/store unit 350 may transmit at least one of the received input data, program, or control signal to the on-chip buffer 340. In addition, the load/store unit 350 may transmit output data to the outside through an external interface. The load/store unit 350 may transmit output data generated by the processing unit 310 to the outside.

The memory 320 may quickly provide an activation value to the processing unit 310 which has a large amount of calculations/operations, and receive the activation quickly, thereby further improving the operation speed of the neural core SoC 10. The operation of the machine learning model may be controlled such that an activation value for skipping the operation can be determined among the activation values stored in the memory 320, and the operation associated with the determined activation value is skipped. Skipping the operation associated with the activation value herein may mean that the operation is skipped in some processing elements included in the element array.

For example, skipping the operation associated with the activation value may refer to skipping the process of checking the weight by the associated processing element, the process of multiplying the weight and the activation value, etc. Additionally or alternatively, the relevant processing element may output zero (0) as an operation result value for the activation value for skipping. The operation result value output as zero may be subjected to an additional operation (e.g., addition operation, etc.) with the output result value of another activation, and the additional operation result value may be output as the output activation value.

An activation function may be used for determining the operation skip target. In the field of artificial neural network technology, the Rectified Linear Unit (ReLU) function is used as an activation function. The ReLU is a function that outputs the input value as zero if the input value is less than zero, and outputs the input value as is if the input value is greater than zero. Meanwhile, the ReLU function only fixes the threshold as zero to determine the input value as zero, and it does not adaptively change the threshold according to the environment of the machine learning model. Accordingly, if the input value using the ReLU function is a positive real number, the output value is not zero.

On the other hand, as will be described below, according to various examples of the present disclosure, the threshold that serves as the standard for the operation skip target may be determined to be various values. Accordingly, even when the activation value is a positive real number, the activation value may be changed to zero and stored in the memory. In addition, the threshold for skipping operations may be adaptively and dynamically changed based on the distribution of a plurality of activation values associated with at least one layer included in the machine learning model.

Figure 4:
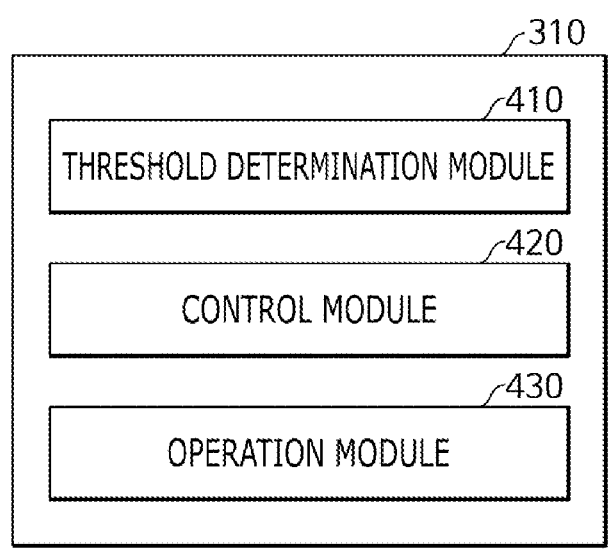
FIG. 4 is a block diagram provided to explain the processing unit of FIG. 3 in detail.

FIG. 4 is a block diagram provided to explain the processing unit 310 of FIG. 3 in detail. As illustrated in FIG. 4, the processing unit 310 may include a threshold determination module 410, a control module 420, and an operation module 430.

The threshold determination module 410 may dynamically determine the threshold based on the distribution of a plurality of activation values associated with at least one layer included in the machine learning model. The threshold may be a value equal to or greater than zero. In addition, lower and upper limits of the threshold may be determined in advance. Zero may be determined to be the lower limit, and any natural number or real number greater than 0 may be determined to be the upper limit.

The threshold determination module 410 may acquire a target activation value for comparison from a plurality of activation values associated with at least one layer, and if the acquired target activation value is equal to or less than the threshold, may update the threshold such that the threshold is decreased by a predetermined amount. The absolute value of the target activation value and the threshold may be compared to each other to determine whether the target activation value is equal to or less than the threshold. When comparing the absolute value with the threshold in this way, the activation value included in the range from −a to +a (where "a" is any real number) may be determined to be the activation value for skipping.

When comparing the threshold and the activation value/exponent, the threshold determination module 410 may determine whether the threshold is equal to or less than the activation value/exponent. For convenience of explanation, in the examples described below, it is explained that whether the threshold is less than the activation value/exponent is determined. In addition, in the examples described below, when the activation value is less than the threshold, it may mean that the activation value is less than the threshold or that the absolute value of the activation value is less than the threshold.

According to another examples, the threshold determination module 410 may acquire a target activation value for comparison from the plurality of activation values associated with at least one layer, extract an exponent from the target activation value, and, if the extracted exponent is less than the threshold, update the threshold such that the threshold is decreased by a predetermined amount. According to some examples, the threshold determination module 410 may decrease the threshold by dividing the threshold by 2.

The threshold determination module 410 may measure the time during which the threshold does not change, and when the measured time reaches a predetermined threshold time, may update the threshold so that the threshold is increased by a predetermined amount. According to some examples, the threshold determination module 410 may increase the threshold by a factor of 2 by multiplying the threshold by 2.

The operation module 430 may perform operations associated with algorithms implemented by the machine learning models. The operation module 430 may include a PE array. The PE array may include a plurality of processing elements, and each of the plurality of processing elements may be related to at least one layer of an artificial neural network. For example, each of the plurality of processing elements may perform a multiplication operation of the input activation (Act_In) value and the weight.

The operation module 430 may output an output activation (Act_Out) value based on at least one activation value output from at least one processing element.

The control module 420 may determine an activation value for skipping from the activation values associated with at least one layer included in the machine learning model, and control the operations of the machine learning model such that operations associated with the determined activation value are skipped. The control module 420 may determine whether the activation value associated with at least one layer included in the machine learning model is less than the threshold for skipping the operation (i.e., the threshold determined by the threshold determination module). The control module 420 may determine whether the absolute value of the activation value associated with at least one layer included in the machine learning model is less than the threshold so as to determine an activation value for skipping.

According to some examples, the activation value may be expressed as a floating point number in a predetermined format. For example, the activation value may be expressed as a floating point number in the FP16 format proposed by the Institute of Electrical and Electronics Engineers (IEEE) and stored in a memory. In this case, the control module 420 may acquire an exponent from the activation values expressed in floating point numbers and determine whether the acquired exponent is less than a threshold. In addition, the threshold may be determined to be a multiple of 2, and the threshold and activation value may be expressed in binary numbers.

The predetermined format may include various precision formats. For example, the predetermined formats may include various precision formats such as INT2, INT8, INT16, FP8, FP16, FP32, FP64, bfloat16, TensorFloat, fp24, and may include a Configurable Floating Point format that can be set in various ways.

If it is determined that the activation value/exponent is less than the threshold, the control module 420 may control the operations of the machine learning model such that operation associated with the activation value that is less than the threshold is skipped in the machine learning model.

If the activation value is an output activation value and the activation value/exponent is less than the threshold, the control module 420 may determine the activation value to be zero and store the value in the memory. If an activation value corresponding to zero is input to a specific layer as an input activation value, the operation module 430 may skip the operation associated with the input activation value having the zero value. For example, a processing element that receives a zero value may not perform an operation associated with the input activation value.

According to some examples, the output activation value may be stored in the memory as is, and if a specific output activation value/exponent is less than a threshold and a specific output activation value is input to a specific layer, the control module 420 may control the operations of the machine learning model such that the operation associated with the specific output activation value is skipped in the specific layer. For example, the control module 420 may transmit, to the operation module 430, a skip flag or a skip command that indicates skipping for a specific output activation value with a value/exponent less than the threshold, and the operation module 430 may skip an operation associated with a specific activation value associated with the skip flag or skip command. As another example, the control module 420 may identify a specific processing element to which a specific output activation value having a value or exponent less than the threshold is input, and transmit a skip flag/skip command to the identified specific processing element, and the specific processing element may skip the operation associated with the specific output activation value.

Figure 5:
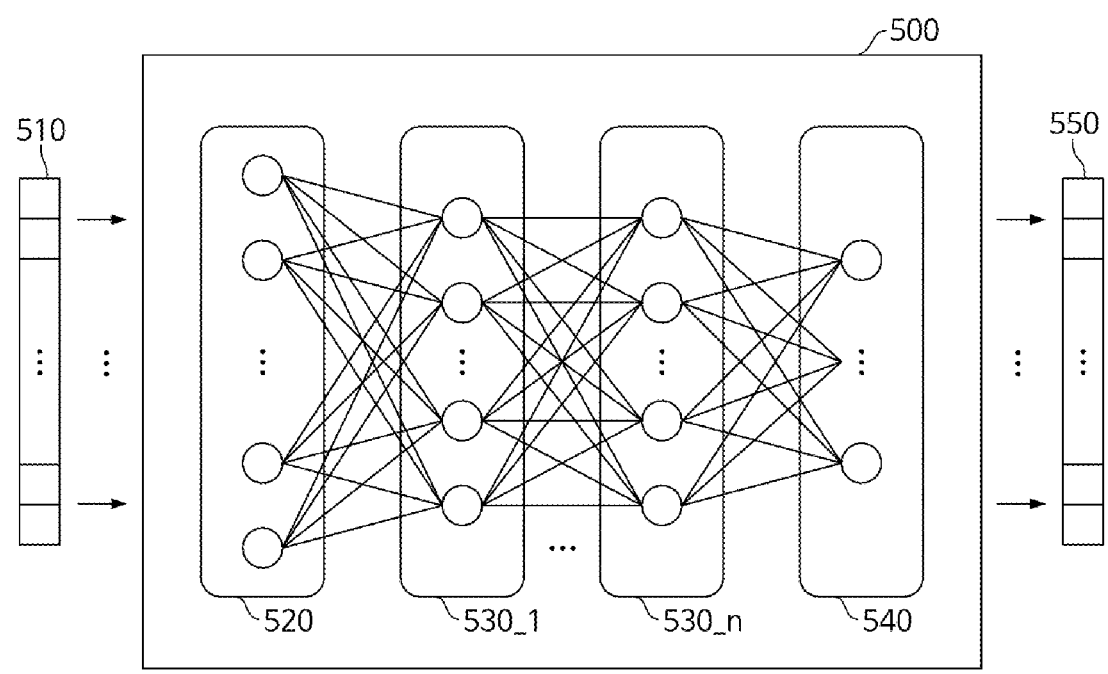
FIG. 5 is an exemplary diagram illustrating an artificial neural network model.

FIG. 5 is an exemplary diagram illustrating an artificial neural network model 500. In machine learning technology and cognitive science, the artificial neural network model 500 as an example of the machine learning model may refer to a statistical learning algorithm implemented based on a structure of a biological neural network, or to a structure that executes such algorithm.

The artificial neural network model 500 may represent a machine learning model that acquires a problem solving ability by repeatedly adjusting the weights of synapses by the nodes that are artificial neurons forming the network through synaptic combinations as in the biological neural networks, thus training to reduce errors between a target output corresponding to a specific input and a deduced output. For example, the artificial neural network model 500 may include any probability model, neural network model, and the like, that is used in artificial intelligence learning methods such as machine learning and deep learning. The artificial neural network model 500 may be associated with the operation module 430 illustrated in FIG. 4.

The artificial neural network model 500 may include various models that require inference. For example, the artificial neural network model 500 may include an artificial neural network model configured to infer data associated with an order for a security on a target stock exchange at a point in the future (e.g., data about prices, price movements, etc.) by using input data generated based on market data from one or more stock exchanges.

The artificial neural network model 500 may be implemented as a multi-layer perceptron (MLP) formed of multi-layer nodes and connections between them. The artificial neural network model 500 may be implemented using one of various artificial neural network model structures including the MLP. As illustrated in FIG. 5, the artificial neural network model 500 may include an input layer 520 to receive an input signal or data 510 from the outside, an output layer 540 to output an output signal or data 550 corresponding to the input data, and (n) number of hidden layers 530_1 to 530_*n* (where n is a positive integer) positioned between the input layer 520 and the output layer 540 to receive a signal from the input layer 520, extract the features, and transmit the features to the output layer 540. The output layer 540 may receive signals from the hidden layers 5301 to 530_*n*, and output data to the outside.

The method of training the artificial neural network model 500 includes the supervised learning that trains to optimize for solving a problem with inputs of teacher signals (correct answers), and the unsupervised learning that does not require a teacher signal. For example, the artificial neural network model 500 may be trained by the supervised and/or unsupervised learning to infer the data associated with the market order in the target stock exchange. For example, the artificial neural network model 500 may be trained by the supervised learning to infer the reference price of the target item at one or more future time points from the reference input data. The artificial neural network model 500 trained in this way may be included in a neural processing system. For example, the weight of each node included in the trained artificial neural network model 500 may be applied to the processing of a plurality of elements included in the PE array, so that the algorithm associated with the artificial neural network model 500 may be quickly performed on a hardware basis.

As illustrated in FIG. 5, at least one activation value may be output to each of the plurality of layers 520 to 540, and the output activation value may be input to the next layer. In other words, the nth layer may influence the operation result of the (n+1)th layer. Final output value may be output from the output layer 540 included in the artificial neural network model 500.

Meanwhile, the output activation value output from a specific node may have an insignificant value to an extent that will not affect the final result. In this case, by skipping the operation associated with the activation value, which has an insignificant value to the extent that will not affect the final result, the computing resources and power resources of the neural processing system may be saved, and the final result may be output more quickly. As described above, the activation value for skipping operation may be determined by comparing the activation value/exponent and the threshold.

Various examples of skipping the operations associated with the activation values will be described with reference to FIGS. 6 to 9.

Figure 6:
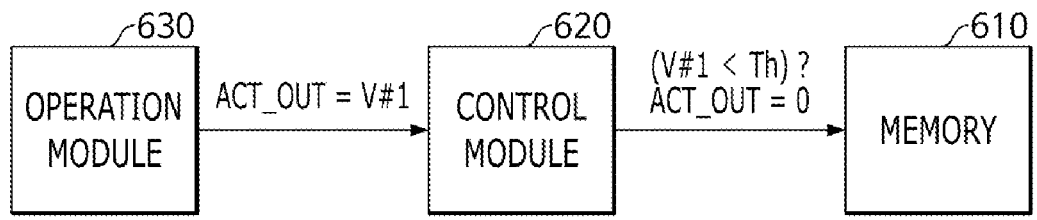
FIG. 6 is a diagram illustrating a method for changing an activation value and storing the resultant value in a memory to skip an operation associated with the activation value.

FIG. 6 is a diagram illustrating a method for changing an activation value and storing the resultant value in a memory 610 to skip an operation associated with the activation value. An operation module 630 and a control module 620 illustrated in FIG. 6 may correspond to the control module 420 and the operation module 430 illustrated in FIG. 4.

Referring to FIG. 6, the operation module 630 may output an output activation (Act_Out) value based on a result value operated by at least one layer included in the machine learning model. The output activation value is illustrated as V #1.

The control module 620 may determine whether the output activation value (V #1) is less than the threshold (Th). If it is determined that the output activation value (V #1) is less than the threshold (Th), the control module 620 may determine the output activation value (V #1) to be zero and store the same in the memory 610. That is, if the output activation value (V #1) is less than the threshold (Th), the control module 620 may change the output activation value (V #1) to zero and store the same in the memory 610. For the activation values having zero among the plurality of output activation values stored in the memory 610, the associated operations thereof may be skipped. The output activation value output from the nth layer (where n is a natural number) may be used as the input activation value of the (n+1)th layer, and when the operation is performed in the (n+1)th layer, the operation associated with an activation value having zero may be skipped.

Figure 7:
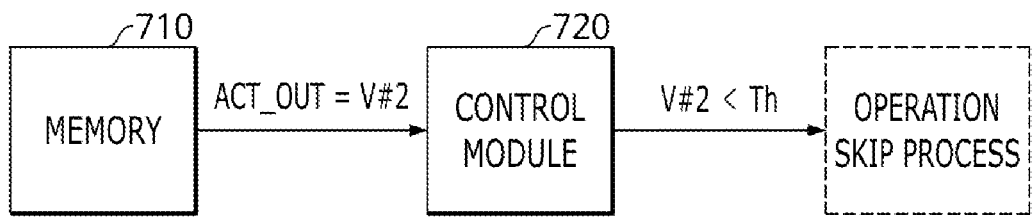
FIG. 7 is a diagram illustrating a method for skipping an operation associated with an activation value that is less than a threshold.

FIG. 7 is a diagram illustrating a method for skipping an operation associated with an activation value that is less than a threshold. A control module 720 illustrated in FIG. 7 may correspond to the control module 420 illustrated in FIG. 4.

Referring to FIG. 7, in other examples of the present disclosure, the output activation value may be stored as an original value in a memory 710. Additionally, even an output activation value that is less than the threshold (Th) may also be stored in the memory 710 without being changed, that is, stored as original value.

With the output activation value stored as the original value in the memory 710, the control module 720 may acquire an output activation value input to a specific layer of the machine learning model. In FIG. 7, the output activation value is illustrated as V #2.

The control module 720 may determine whether the output activation value (V #2) is less than the threshold (Th). If it is determined that the output activation value (V #2) is less than the threshold (Th), the control module 720 may control the operation of the machine learning model such that the operation associated with the output activation value (V #2) is skipped. For example, if the output activation value (V #2) that is less than the threshold is input to a specific layer, the control module 720 may control the operation of the machine learning model such that the operation associated with a specific output activation value is skipped in the specific layer. In some examples, the control module 720 may transmit, to the operation module, a skip flag or skip command for a specific output activation value that is less than the threshold. In this case, the operation module may skip the operation associated with a specific activation value associated with the skip flag or skip command. As another example, the control module 720 may identify a specific processing element to which the output activation value (V #2) that is less than the threshold is input, and transmit a skip flag or skip command to the identified specific processing element, and the specific processing element may skip the operation associated with the output activation value.

Figure 8:
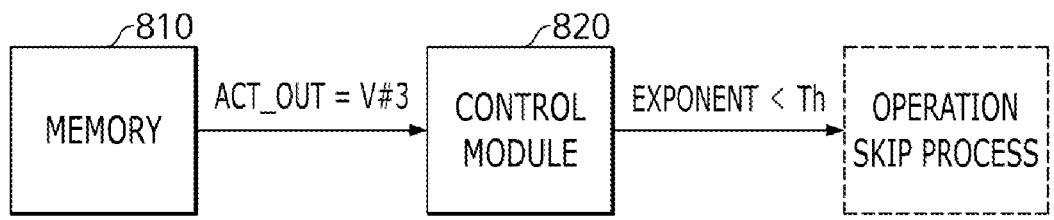
FIG. 8 is a diagram illustrating a method for skipping an operation associated with an activation value having an exponent below a threshold.

FIG. 8 is a diagram illustrating a method for skipping an operation associated with an activation value having an exponent below a threshold. A control module 820 illustrated in FIG. 8 may correspond to the control module 420 illustrated in FIG. 4.

Referring to FIG. 8, in other examples of the present disclosure, the activation value may be expressed as a floating point number in the FP16 format proposed by IEEE, and stored in a memory 810. In addition, the threshold may be a multiple of 2 and may be determined dynamically. Additionally or alternatively, each of the threshold and activation values may be expressed as a binary number.

The control module 820 may acquire an activation value (V #3) from the memory 810 and extract an exponent from the activation value (V #3). The control module 820 may determine whether the acquired exponent is less than a threshold. If it is determined that the exponent is less than the threshold, the control module 820 may control the operations of the machine learning model such that the operation associated with the activation value having the exponent that is less than the threshold is skipped in the machine learning model. For example, if the output activation value (V #3) with an exponent that is less than the threshold is input to a specific layer, the control module 820 may control the operations of the machine learning model such that the operation associated with the specific output activation value is skipped in the specific layer. In some examples, the control module 820 may transmit, to the operation module, a skip flag or skip command for a specific output activation value with an exponent less than the threshold. In this case, the operation module may skip the operation associated with the specific activation value associated with the skip flag or skip command. As another example, the control module 820 may identify a specific processing element to which the output activation value (V #3) with the exponent that is less than the threshold is input, and transmit a skip flag or skip command to the identified specific processing element, and the specific processing element may skip the operation associated with the output activation value.

In another examples, the control module 820 may determine an activation value for skipping among the output activation (Act_Out) values stored in the memory 810, and change the determined activation value to zero. For example, when the output activation value is stored in the memory 810, the control module 820 may extract the exponent included in the output activation value and determine whether the extracted exponent is less than the threshold (Th). If it is determined that the output activation value is less than the threshold (Th), the control module 820 may determine the output activation value to be zero and store the same in the memory 810. That is, if the output activation value is less than the threshold Th, the control module 820 may change the output activation value to zero and store the same in the memory 810. For the activation value having a zero value among the plurality of output activation values stored in the memory 810, the operation thereof may be skipped in the machine learning model.

Figure 9:
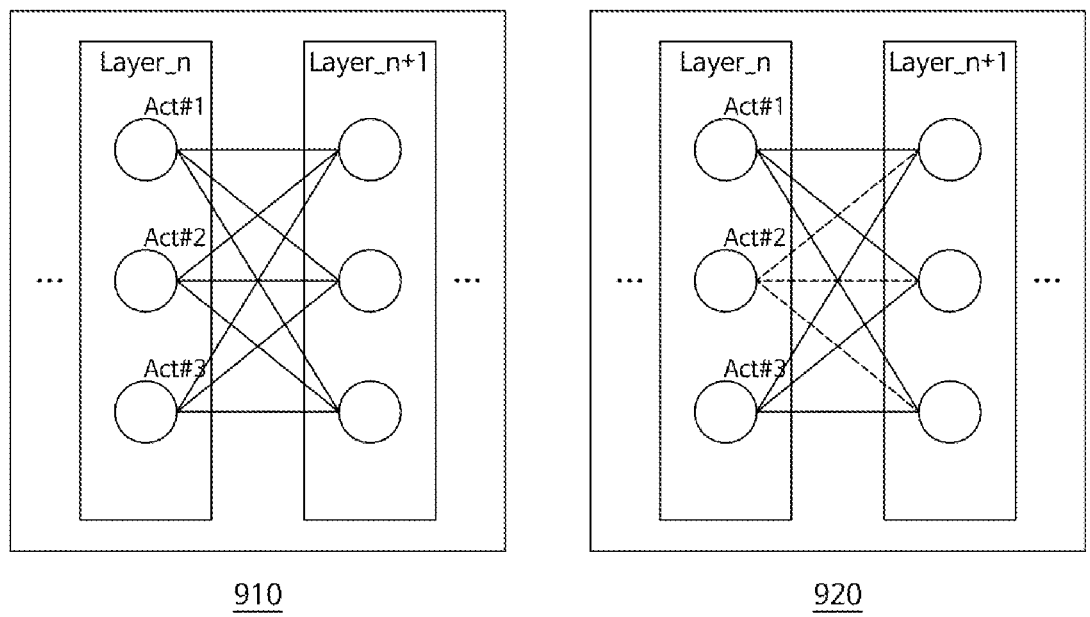
FIG. 9 is a diagram illustrating a first machine learning model performing operations associated with all activation values and a second machine learning model performing operations associated with some activation values.

FIG. 9 illustrates a first machine learning model 910 performing operations associated with all activation values and a second machine learning model 920 performing operations associated with some activation values. The first machine learning model 910 and the second machine learning model 920 are illustrated as artificial neural networks. FIG. 9 illustrates that the first activation value (Act #1), the second activation value (Act #2), and the third activation value (Act #3) are output from the nth layer (Layer_n) included in the first machine learning model 910 and the second machine learning model 920. As illustrated in FIG. 9, the (n+1)th layer (Layer_n+1) included in the first machine learning model 910 performs operations for all activation values (Act #1, Act #2, and Act #3) output from the nth layer.

On the other hand, each of the activation values (Act #1, Act #2, and Act #3) output from the nth layer (Layer_n) included in the second machine learning model 920 may be compared with a threshold to determine an activation value (Act #2) for skipping. The activation value (Act #2) for skipping may have a minimal effect on the final result value.

As another example, a plurality of exponents may be acquired from a plurality of activations (Act #1, Act #2, and Act #3) output from the nth layer (Layer_n) included in the second machine learning model 920, and each of the acquired plurality of exponents may be compared with a threshold to determine an activation value (Act #2) for skipping. FIG. 9 illustrates that the activation value for skipping is the second activation value (Act #2) which is indicated by a dotted line. As illustrated in FIG. 9, if all nodes included in the (n+1)th layer (Layer_n+1) receive the second activation value (Act #2), the amount of operations in the (n+1)th layer (Layer_n+1) may be significantly reduced. That is, the amount of operations of the (n+1)th layer (Layer_n+1) included in the second machine learning model 920 may be reduced to approximately 33% compared to the (n+1)th layer (Layer_n+1) included in the first machine learning model 910.

Figure 10:
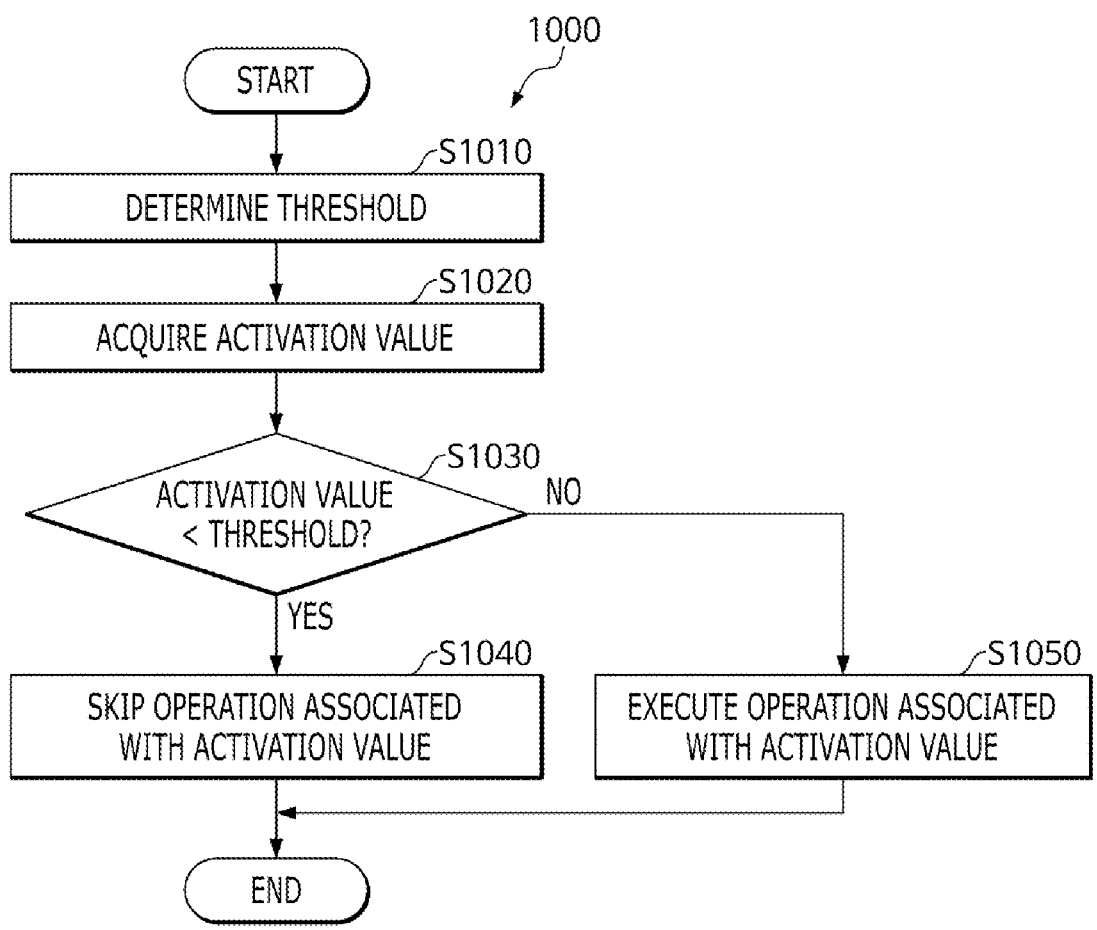
FIG. 10 is a flowchart provided to explain a method for controlling an operation of a machine learning model.
Figure 11:
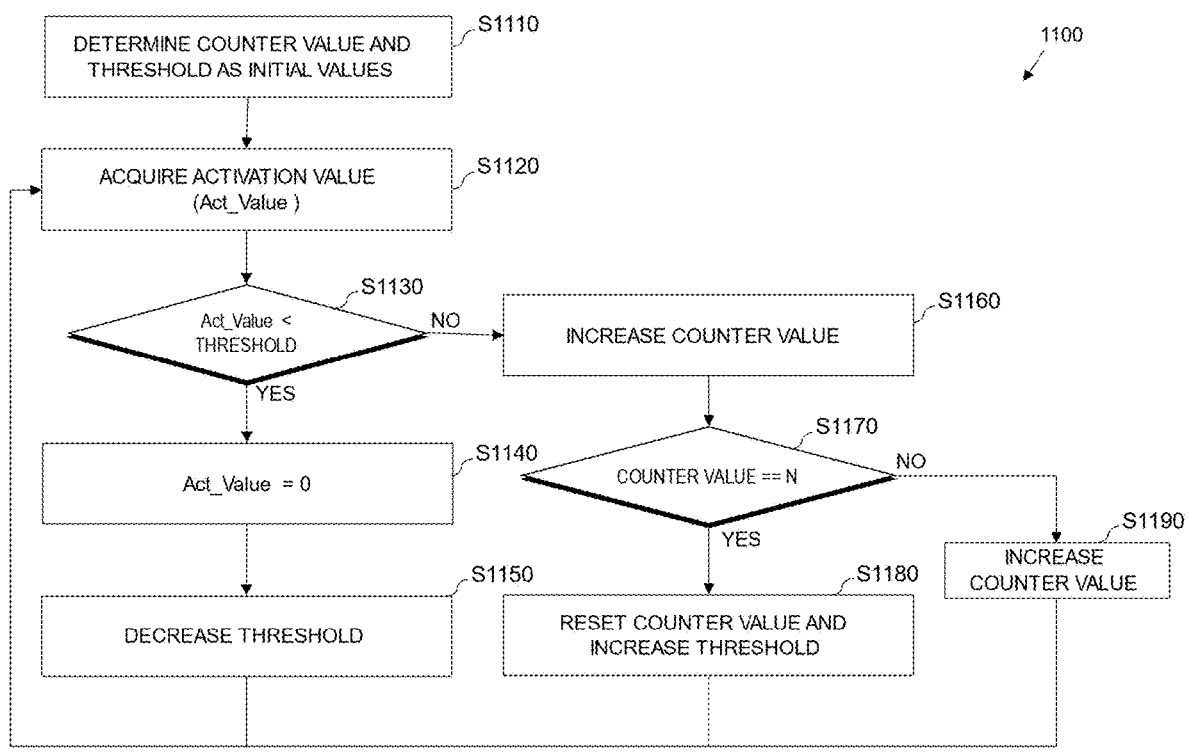
FIG. 11 is a flowchart provided to explain a method for dynamically determining a threshold.
Figure 12:
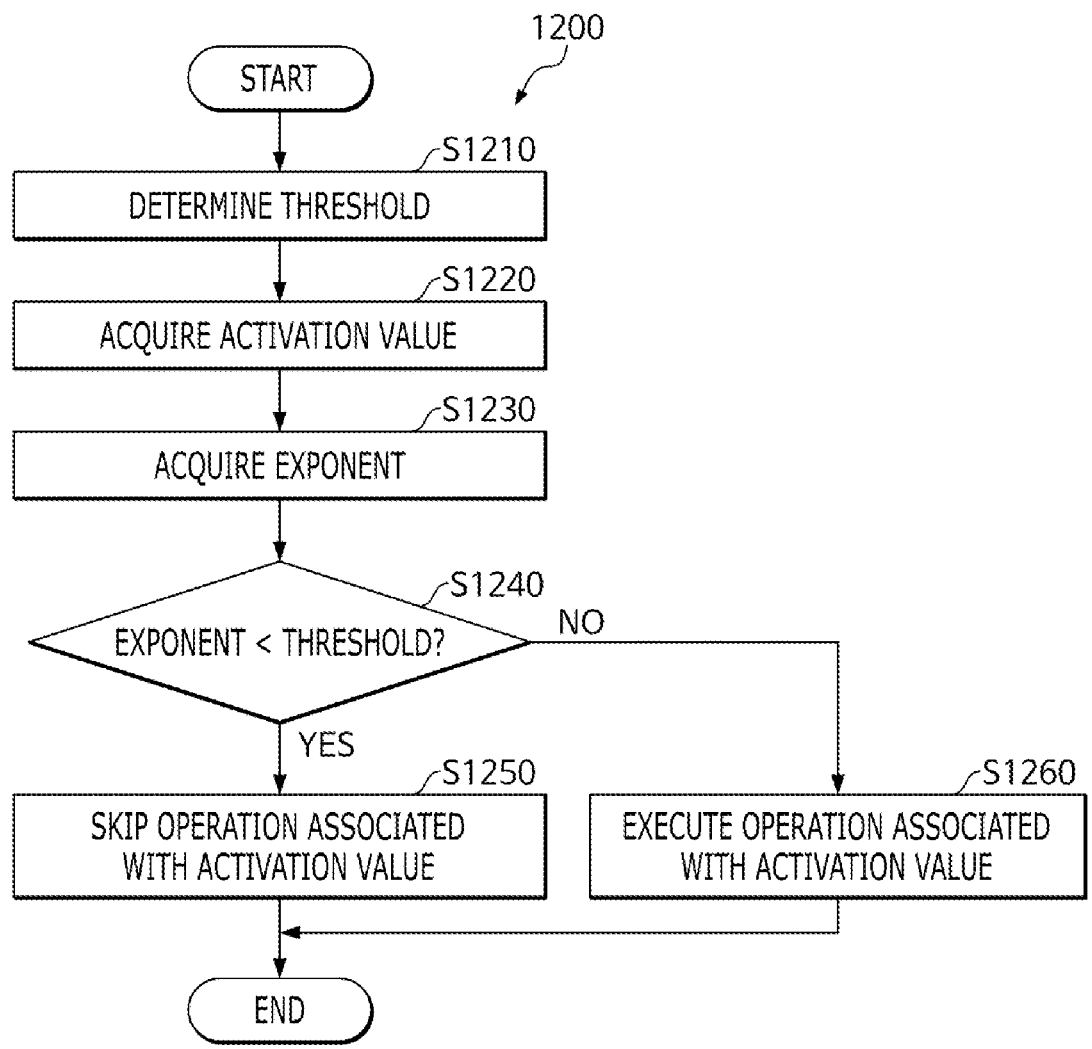
FIG. 12 is a flowchart provided to explain a method for controlling an operation of a machine learning model.

Hereinafter, a method for controlling an operation of a machine learning model will be described with reference to FIGS. 10 to 12. The method illustrated in FIGS. 10 to 12 is merely one example of achieving the object of the present disclosure, and it goes without saying that some steps may be added or deleted as necessary. In addition, the methods shown in FIGS. 10 to 12 may be performed by one or more processors included in the neural processing system. For example, the method shown in FIGS. 10 to 12 may be performed by the threshold determination module 410, the control module 420, and/or the operation module 430 included in the processing unit 310 of FIGS. 2 and 3. For convenience of explanation, it will be described that each step shown in FIGS. 10 to 12 is performed by the processing unit 310 included in the neural core SOC 10 of FIG. 2.

FIG. 10 is a flowchart provided to explain an method 1000 for controlling an operation of a machine learning model. The processing unit may dynamically determine a threshold for skipping the operation, at S1010. The processing unit may dynamically determine the threshold based on the distribution of a plurality of activation values associated with at least one layer included in the machine learning model. A specific method for dynamically determining the threshold based on the distribution of a plurality of activation values will be described below with reference to FIG. 11.

The processing unit may acquire an activation value associated with at least one layer included in the machine learning model, at S1020. The activation value may be an input activation value or an output activation value. For example, the activation value output from a specific layer may be stored in a memory, and the processing unit may access the memory to acquire the activation value. As another example, the processing unit may receive an activation value output from a specific layer from a processing element associated with the specific layer before being stored in the memory.

The processing unit may determine whether the acquired activation value is less than a threshold, at S1030. In this case, the processing unit may determine whether the absolute value of the acquired activation value is less than the threshold.

If it is determined that the acquired activation value is less than the threshold, the processing unit may control the operations of the machine learning model such that the operation associated with the activation value is skipped in the machine learning model, at S1040. The processing unit may acquire the activation value output from the first layer included in the machine learning model, and if the acquired activation value is less than the threshold, determine the activation value to be zero and store the same in a memory. When the operations associated with the second layer into which the output value from the first layer is input are performed, the processing unit may control the operations of the machine learning model such that the operation associated with the activation value determined to be zero is skipped.

In some examples, the activation value may be stored in a memory without any adjustments to the value, that is, may be stored in its original form. The activation value may be an output value from the first layer included in the machine learning model. With the original activation value stored in the memory, if the operations associated with the second layer into which the output value from the first layer is input are performed and the output value from the first layer is less than the threshold, the processing unit may control the operations of the machine learning model such that the operation associated with the output value from the first layer is skipped in the second layer.

Meanwhile, if it is determined that the acquired activation value is equal to or greater than the threshold, the processing unit may control the operations of the machine learning model such that the operation associated with the activation value is performed in the machine learning model, at S1050.

FIG. 10 illustrates one cycle associated with one activation value, and the process associated with FIG. 10 may be repeatedly performed if an activation value is output from or input to the machine learning model.

FIG. 11 is a flowchart provided to explain a method 1100 for dynamically determining a threshold. The method 1100 according to FIG. 11 may proceed if a command for dynamically setting a threshold is received. The method 1100 according to FIG. 11 may be interrupted if a command to statically change the threshold is received. If the threshold is statically determined, the currently determined threshold may be continuously maintained or the threshold may be changed to a predetermined default value.

The processing unit may determine each of the counter value and threshold to predetermined initial values, at S1110. The initial value for the counter value may be determined to be "0", and the initial value for the threshold may be determined to be a default value.

The processing unit may acquire an activation value (Act_Value) output from a specific layer, at S1120. The processing unit may determine whether the acquired activation value (Act_Value) is less than the threshold, at S1130. In this case, the processing unit may determine whether the absolute value of the acquired activation value (Act_Value) is less than the threshold.

If it is determined that the acquired activation value (Act_Value) is less than the threshold, the processing unit may determine the activation value to be zero and store the same in the memory, at S1140. In some examples, the processing unit may not change the activation value to zero and store the original value as it is in the memory. The processing unit may decrease the threshold by a predetermined amount to update the threshold, at S1150.

Meanwhile, if it is determined that the acquired activation value (Act_Value) is equal to or greater than the threshold, the processing unit may increase a counter value to measure the duration in which the threshold does not change, at S1160. The processing unit may determine whether the counter value reaches a predetermined value (i.e., N), at S1170. That is, the processing unit may determine whether the duration in which the threshold does not change reaches a predetermined threshold time based on the counter value.

If it is determined that the counter value reaches a predetermined value (i.e., N), the processing unit may initialize the counter value and increase the threshold by the predetermined value to update the threshold, at S1180. That is, if the duration in which the threshold does not change reaches a predetermined threshold time, the processing unit may increase the threshold by a predetermined value to update the threshold.

Meanwhile, if it is determined at S1170 that the counter value does not reach the predetermined value (i.e., N), the counter value may be increased by a predetermined value, at S1190. The increase in counter value may be different from the increase in threshold.

As illustrated in FIG. 11, the number of comparisons between the activation value and the threshold may be set such that the comparison may be performed repeatedly corresponding to the number of a plurality of activation values. That is, S1120 and onward may be performed repeatedly corresponding to the number of a plurality of activation values.

As described above, the threshold is not uniformly fixed, but may be dynamically determined based on the distribution of activation values.

FIG. 12 is a flowchart provided to explain a method 1200 for controlling an operation of a machine learning model. The processing unit may dynamically determine a threshold for skipping the operation, at S1210. The threshold may be a value obtained by multiplying 2 by a predetermined number of times. Additionally or alternatively, each of the threshold and activation values may be a binary number.

The processing unit may determine the threshold based on the distribution of a plurality of activation values associated with at least one layer included in the machine learning model. For example, each of the activation value and threshold may be a binary number. A specific method for dynamically determining the threshold based on the distribution of a plurality of activation values will be described below with reference to FIG. 13.

The processing unit may acquire an activation value associated with at least one layer included in the machine learning model, at S1220. The activation value may be an input activation value or an output activation value. For example, the activation value output from a specific layer may be stored in a memory, and the processing unit may access the memory to acquire the activation value. As another example, the processing unit may receive an activation value output from a specific layer from a processing element associated with the specific layer before being stored in the memory.

The processing unit may acquire an exponent from the acquired activation value, at S1230. The processing unit may determine whether the acquired exponent is less than a threshold, at S1240.

If it is determined that the acquired exponent is less than the threshold, the processing unit may control the operations of the machine learning model such that the operation associated with the activation value with the exponent less than the threshold is skipped in the machine learning model, at S1250. The processing unit may acquire the activation value output from the first layer included in the machine learning model, and if the exponent acquired from the activation value is less than the threshold, the processing unit may determine the activation value to be zero and store the same in the memory. When the operations associated with the second layer into which the output value from the first layer is input is performed, the processing unit may control the operations of the machine learning model such that the operation associated with the activation value determined to be zero is skipped.

In some examples, the activation value may be stored in the memory without the value being changed, that is, may be stored in its original form. The activation value may be an output value from the first layer included in the machine learning model. With the original activation value stored in the memory in this way, if the operations associated with the second layer into which the output value from the first layer is input are performed, and the exponent of the output value from the first layer is less than the threshold, the processing unit may control the operations of the machine learning model such that the operation associated with the relevant activation value is skipped.

Meanwhile, if it is determined that the acquired exponent is equal to or greater than the threshold, the processing unit may control the operations of the machine learning model such that the operation associated with the activation value having the exponent is performed, at S1260.

FIG. 12 illustrates one cycle associated with one activation value, and the process associated with FIG. 12 may be repeatedly performed if an activation value is output from or input to the machine learning model.

Figure 13:
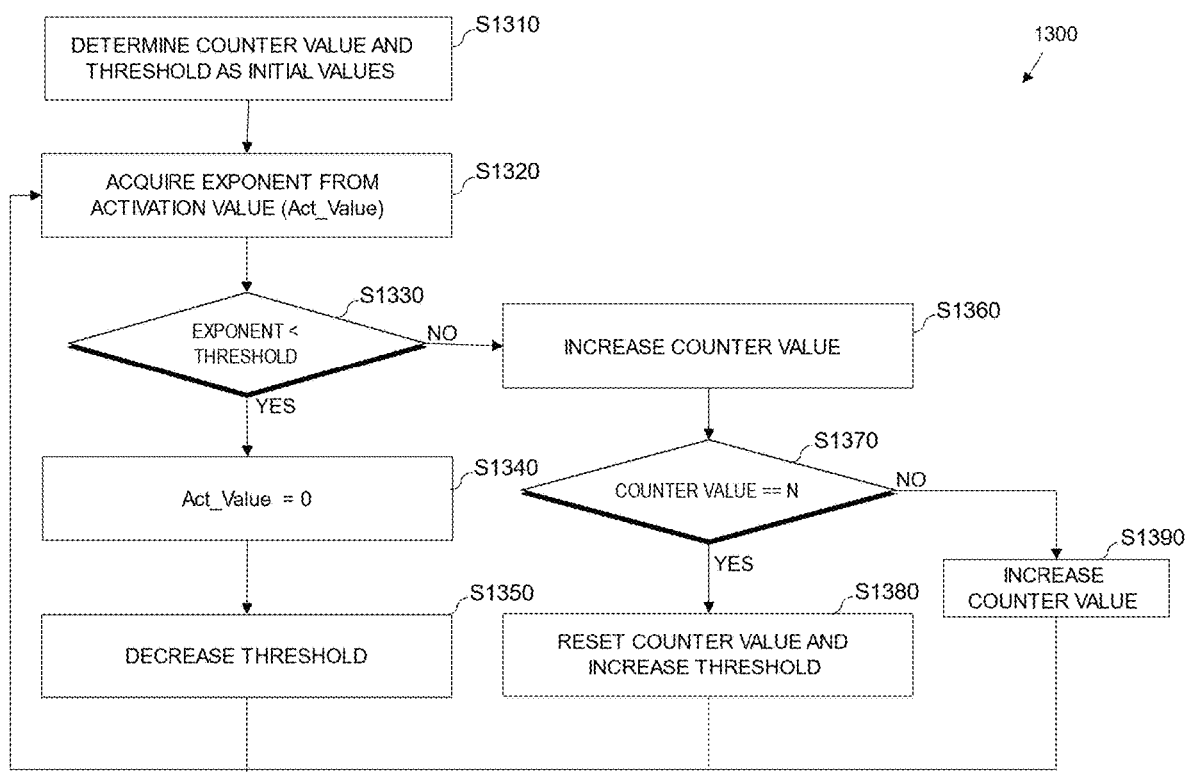
FIG. 13 is a flowchart provided to explain a method for dynamically determining a threshold.

FIG. 13 is a flowchart provided to explain a method 1300 for dynamically determining a threshold. The method 1300 according to FIG. 13 may proceed if a command for dynamically setting a threshold is received. The method 1300 according to FIG. 13 may be interrupted if a command to statically change the threshold is received. If the threshold is statically determined, the currently determined threshold may be continuously maintained or the threshold may be changed to a predetermined default value.

The processing unit may determine each of the counter value and threshold to predetermined initial values, at S1310. The initial value for the counter value may be determined to be "0", and the initial value for the threshold may be determined to be a default value.

The processing unit may acquire the activation value (Act_Value) output from a specific layer and acquire an exponent from the acquired activation value, at S1320. The processing unit may determine whether the acquired exponent is less than a threshold, at S1330. The threshold may be a value obtained by multiplying 2 by a predetermined number of times. Additionally or alternatively, each of the activation value and threshold may be a binary number.

If it is determined that the acquired exponent is less than the threshold, the processing unit may determine the activation value to be zero and store the same in the memory, at S1340. In some examples, the processing unit may not change the activation value to zero and store the original value as it is in the memory. The processing unit may decrease the threshold by a predetermined amount to update the threshold, at S1350. At this time, the processing unit may decrease the threshold by dividing the threshold by 2.

Meanwhile, if it is determined that the acquired exponent is equal to or greater than the threshold, the processing unit may increase the counter value to measure the duration in which the threshold does not change, at S1360. The processing unit may determine whether the counter value reaches a predetermined value (i.e., N), at S1370. That is, the processing unit may determine whether the duration in which the threshold does not change reaches a predetermined threshold time based on the counter value.

If it is determined that the counter value reaches a predetermined value (i.e., N), the processing unit may initialize the counter value and increase the threshold by the predetermined value to update the threshold, at S1380. At this time, the processing unit may increase the threshold by multiplying the threshold by 2.

Meanwhile, if it is determined at S1370 that the counter value does not reach the predetermined value (i.e., N), the counter value may be increased by a predetermined value, at S1390. The increase in counter value may be different from the increase in threshold.

As illustrated in FIG. 13, the number of comparisons between the exponent acquired from the activation value and the threshold may be set such that the comparisons may be performed repeatedly corresponding to the number of a plurality of activation values. That is, S1320 and onward may be performed repeatedly corresponding to the number of a plurality of activation values.

The flowcharts and description above are merely examples and may be implemented differently in some examples. For example, in some examples, the order of respective steps may be changed, some steps may be repeatedly performed, some steps may be omitted, or some steps may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or marking data storage devices, etc. The instructions may be executable by one or more processors, and may cause the processor(s) to perform certain aspects of the functions described in the present disclosure.

If implemented in software, the techniques described above may be stored on a computer-readable medium as one or more instructions or codes, or may be sent via a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for controlling operations of a machine learning model, the method being performed by one or more processors and comprising:

receive a first command to statistically determine a threshold for skipping an operation associated with a node and continuously maintain the threshold;

receive a second command to dynamically determine the threshold for skipping the operation associated with the node;

dynamically determining the threshold for skipping the operation associated with the node based on a distribution of a plurality of activation values associated with at least one layer included in the machine learning model, the machine learning model comprising a plurality of layers including an input layer that receives an input signal and an output layer that outputs an output signal and a plurality of hidden layers positioned between the input layer and the output layer to receive a signal from the input layer, extract features, and transmit the features to the output layer, wherein the plurality of layers includes a first layer including a first set of nodes and a second layer including a second set of nodes;

acquiring an activation value associated with at least one layer included in the machine learning model;

determining whether the activation value is less than the threshold; and if the activation value is less than the threshold, controlling the operations of the machine learning model such that an operation associated with the activation value is skipped in the machine learning model, wherein the activation value includes an output value from the first layer included in the machine learning model, and the controlling the operations of the machine learning model includes, if operations associated with the second layer into which an output value from the first layer is input are performed and the output value from the first layer is less than the threshold, controlling the operations of the machine learning model by transmitting a skip command associated with the output value and storing the output value in a memory without changing the output value to zero such that an operation associated with the output value from the first layer is skipped in the second layer, performing the machine learning model by performing operations associated with the second set of nodes of the second layer and associated with values unassociated with the skip command and skipping the operations associated with the second set of nodes of the second layer and associated with the output value associated with the skip command regardless of whether the output value stored in the memory is zero;

wherein the determining the threshold includes:

when the activation value is less than the threshold, decreasing the threshold by a predetermined amount;

increasing a counter value indicating a time during which the threshold does not change when it is determined that the activation value is equal to or greater than the threshold; and if the counter value reaches a predetermined value, resetting the counter value and updating the threshold such that the threshold is increased by the predetermined amount.

2. The method according to claim 1, wherein the activation value is expressed as a floating-point number in a predetermined format, wherein the method further comprising:

acquiring an exponent from the activation value expressed as the floating-point number;

determining whether the acquired exponent is less than a threshold; and if the acquired exponent is less than the threshold, controlling the operations of the machine learning model such that an operation associated with the activation value is skipped in the machine learning model.

3. The method according to claim 2, wherein the threshold is a value obtained by multiplying 2 by a predetermined number of times.

4. The method according to claim 2, wherein each of the activation value and the threshold is a binary number.

5. The method according to claim 2, further comprising, before the acquiring the activation value, determining the threshold based on a distribution of a plurality of activation values associated with the at least one layer.

6. The method according to claim 5, wherein the determining the threshold includes:

determining a target activation value for comparison from a plurality of activation values associated with the at least one layer;

acquiring a target exponent from the determined target activation value; and if the acquired target exponent is less than the threshold, updating the threshold such that the threshold is decreased by a predetermined amount.

7. The method according to claim 6, wherein the updating the threshold includes decreasing the threshold by dividing the threshold by 2.

8. The method according to claim 1, wherein the updating the threshold includes updating the threshold by multiplying the threshold by 2.

9. The method according to claim 2, wherein the acquiring the activation value includes acquiring the activation value from a memory, wherein the activation value includes an output value from a first layer included in the machine learning model, and the controlling the operations of the machine learning model includes, if operations associated with a second layer into which the output value from the first layer is input are performed, and an exponent of the output value from the first layer is less than the threshold, controlling the operations of the machine learning model such that an operation associated with the activation value is skipped.

10. A non-transitory computer-readable recording medium storing instructions for execution by the one or more processors that, when executed by the one or more processors, cause the one or more processors to perform the method according to claim 1.

11. A processing system comprising: a memory storing one or more instructions; and a processor configured to execute one or more instructions in the memory to:

receive a first command to statistically determine a threshold for skipping an operation associated with a node and continuously maintain the threshold;

receive a second command to dynamically determine the threshold for skipping the operation associated with the node;

dynamically determine the threshold for skipping the operation associated with the node based on a distribution of a plurality of activation values associated with at least one layer included in a machine learning model, the machine learning model comprising a plurality of layers including an input layer that receives an input signal and an output layer that outputs an output signal and a plurality of hidden layers positioned between the input layer and the output layer to receive a signal from the input layer, extract features, and transmit the features to the output layer, wherein the plurality of layers includes a first layer including a first set of nodes and a second layer including a second set of nodes;

acquire an activation value associated with at least one layer included in a machine learning model;

determine whether the activation value is less than the threshold; and if the activation value is less than the threshold, control operations of the machine learning model such that an operation associated with the activation value is skipped in the machine learning model, wherein the activation value includes an output value from the first layer included in the machine learning model, and the processor is further configured to, if operations associated with the second layer into which an output value from the first layer is input are performed, and the output value from the first layer is less than the threshold, control the operations of the machine learning model by transmitting a skip command associated with the output value and storing the output value in a memory without changing the output value to zero such that an operation associated with the output value from the first layer is skipped in the second layer, performing the machine learning model by performing operations associated with the second set of nodes of the second layer and associated with values unassociated with the skip command and skipping the operations associated with the second set of nodes of the second layer and associated with the output value associated with the skip command regardless of whether the output value stored in the memory is zero;

wherein the determining the threshold includes:

when the activation value is less than the threshold, decreasing the threshold by a predetermined amount;

increasing a counter value indicating a time during which the threshold does not change when it is determined that the activation value is equal to or greater than the threshold; and if the counter value reaches a predetermined value, resetting the counter value and updating the threshold such that the threshold is increased by the predetermined amount.

* * * * *